United States Patent [19]

Yabe et al.

[11] 4,362,775

[45] Dec. 7, 1982

[54] POLYESTER FILM-HEAT-BONDED METAL SHEET AND CONTAINER MADE THEREOF

[75] Inventors: Kenji Yabe, Shiga; Masayoshi Asakura, Kusatsu; Hiroki Sano, Yokosuka; Masanori Aizawa, Yokohama, all of Japan

[73] Assignees: Toray Industries, Inc.; Toyo Seikan Kaisha, Ltd., both of Japan

[21] Appl. No.: 165,192

[22] Filed: Jul. 1, 1980

[30] Foreign Application Priority Data

Jul. 5, 1979 [JP] Japan .................................. 54/85289

[51] Int. Cl.³ ..................... B32B 15/08; B32B 27/36; C09J 13/14; C09J 13/16
[52] U.S. Cl. .................. 428/213; 156/332; 428/212; 428/214; 428/215; 428/458; 428/461; 428/910; 525/64; 525/170; 525/444
[58] Field of Search ............. 428/458, 461, 910, 212, 428/213, 214, 215; 156/332; 525/64, 170, 444

[56] References Cited

U.S. PATENT DOCUMENTS

| 2,961,365 | 11/1960 | Sroog ................................... 428/458 |
| 3,054,703 | 9/1962 | Brasure ............................... 428/458 |
| 3,466,348 | 9/1969 | Wiener ................................ 525/444 |
| 3,699,187 | 10/1972 | Gardziella ........................... 156/332 |
| 4,070,417 | 1/1978 | Isaka ................................... 525/444 |
| 4,110,411 | 8/1978 | Imanaka .............................. 525/92 |
| 4,264,667 | 4/1981 | Murakami ........................... 428/195 |

*Primary Examiner*—Dennis L. Albrecht
*Attorney, Agent, or Firm*—Austin R. Miller

[57] ABSTRACT

A polyester film-heat-bonded metal sheet is provided, which comprises a biaxially oriented polyester film or films, heat-bonded to a metal sheet by means of an adhesive layer interposed therebetween. The adhesive layer is made of a polyblend comprised of, based on the weight of the polyblend, 5 to 80 wt. % of at least one high melting point polyester having a melting point of at least 200° C. and 20 to 95 wt. % of at least one low melting point polyester having a melting point of at least 100° C., but not higher than a temperature which is 5° C. lower than the melting point of the high melting point polyester. The polyblend may contain a minor amount of a polyolefin resin. The polyester film-heat-bonded metal sheet has good formability and is suitable for cans and other containers. The containers exhibit enhanced impact resistance, adaptability to retort treatment and corrosion resistance.

17 Claims, No Drawings

POLYESTER FILM-HEAT-BONDED METAL SHEET AND CONTAINER MADE THEREOF

BACKGROUND OF THE INVENTION (1) Field of the Invention

This invention relates to a metal sheet having heat-bonded thereto a biaxially oriented polyester film or films, which sheet is used for cans and other containers. It also relates to a container, especially a side seamless container, including a closure, made of the polyester film-heat-bonded metal sheet.

(2) Description of the Prior Art

In order to impart corrosion resistance to metal sheets, the metal sheets have heretofore been coated with various synthetic resins. Typical synthetic resins used include thermosetting resins such as epoxy resins, unsaturated polyester resins, phenolic resins and thermosetting acrylic resins. The metal sheets also have been laminated with a film of thermoplastic resins such as polyesters, polyvinyl chloride and polyolefins. These thermoplastic resins exhibit generally a poor adhesion to the metal sheets and, therefore, there has been a need of using a suitable adhesive or primer. Among the thermoplastic resins, polyesters are advantageously used as a protective coating for cans and other containers in view of their adhesion, thermal resistance and hygienic qualities. Particularly, protective coatings of the following polyesters are popularly used: (i) polyethylene terephthalate (hereinafter abbreviated as "PET") and co-polyesters predominantly comprised of ethylene terephthalate units, (ii) polybutylene terephthalate (hereinafter abbreviated as "PBT") and copolyesters predominantly comprised of butylene terephthalate units, and (iii) a polyblend of the polyester (i) or (ii) with an ethylene/vinyl acetate copolymer or polystyrene. A protective coating, which is a laminate of a biaxially oriented PET film adhered with a polyethylene film or another polyolefin film by using a adhesive, is also used in a manner such that the polyolefin film side of the laminate faces the metal sheet.

The above-mentioned conventional polyester protective coatings exhibit some of the following defects (i) through (v) when metal sheets laminated with the protective coatings are formed into containers particularly by means of drawing processing.

(i) Although the protective coatings have a satisfactory adhesion to a flank of the metal sheet prior to shaping processing, the protective coatings are liable to be cracked or be delaminated from the metal sheet either when the blank is subjected to severe shaping processing, such as folding and bending, double seaming with a can end, and drawing, or when the container is dropped.

(ii) Most polyester films having a satisfactory adhesion to the metal sheet are soft and sticky, and exhibit poor formability.

(iii) Most polyester protective coatings are not completely satisfactory in thermal resistance, and, when containers made therefrom are subjected to a retort treatment, the protective coverings are delaminated from the containers.

(iv) Because of poor corrosion resistance, the containers tend to be corroded after long term storage, leading to deterioration of the content.

(v) It is difficult to manufacture printed containers. In general, printed containers are manufactured by a process wherein a protective coating film is applied on one side of a metal sheet; the other side of the metal sheet is printed, and; then, the coated metal sheet is formed into containers. In the step of printing, particularly multi-color printing, the printed inks are baked usually at a temperature of at least 150° C. for 30 to 60 minutes. Due to this baking, the protective coating has a tendency of thermally, deteriorating or crystallizing and, thus, the protective coating is liable to be cracked or crazed, or delaminated from the metal sheet in the step of forming into containers.

It is, therefore, a primary object of the present invention to provide a metal sheet having a polyester protective coating, which sheet overcomes the above-mentioned defects, namely, which possesses a good formability and is suitable for cans and other containers having excellent impact resistance, adaptability to retort treatment and corrosion resistance.

Other objects and advantages of the present invention will be apparent from the following description.

SUMMARY OF THE INVENTION

In accordance with the present invention, there is provided a polyester film-heat-bonded metal sheet, which comprises a biaxially oriented polyester film or films, heat-bonded to a metal sheet by means of an adhesive. The adhesive used is a polyblend comprised of, based on the weight of the polyblend, 5 to 80%, preferably 10~70%, by weight of at least one high melting point polyester having a melting point of at least 200° C., preferably at least 210° C., and 20 to 95%, preferably 30 to 90% by weight of at least one low melting point polyester having a melting point of at least 100° C. but not higher than a temperature which is 5° C., preferably 10° C., lower than the melting point of the high melting point polyester.

DESCRIPTION OF THE PREFERRED EMBODIMENT

The biaxially oriented polyester film used as a protective coating film should preferably possess a glass transition temperature of at least 55° C. and a melting point of at least 220° C. in view of formability of the film-heat-bonded metal sheet and adaptability to retort treatment and corrosion resistance of the resulting container. The polyesters used for the preparation of the biaxially oriented film include, for example, PET, polyethylene-2,6-naphthalate and poly-1,4-cyclohexylenedimethylene terephthalate. Of these PET is most preferable. Copolyesters predominantly comprised of ethylene terephthalate units are also preferable, which copolyesters may contain a minor proportion, preferably not larger than 5% by mole, of dicarboxylic acid components, other than terephthalic acid, such as isophthalic acid, sebacic acid and adipic acid, and which may also contain a minor proportion, preferably not larger than 5% by mole, of diol components, other than ethylene glycol, such as butanediol, diethylene glycol, triethylene glycol and 1,4-cyclohexanedimethanol.

The biaxially oriented film is prepared by a conventional procedure. For example, a cast polyester film is stretched 2.5 to 5 times its original length in the longitudinal direction and 2.5 to 5 times its original width in the transverse direction at a temperature higher than the glass transition temperature but lower than the crystallization temperature, and then, heat-set at a temperature of 150° to 250° C. Particularly, a biaxially oriented polyester film, which has been stretched 3.3 to 3.6 times its original length in the longitudinal direction and 3.4 to 3.8 times its original width in the transverse direction and, then, heat-set at a temperature of 220° to 240° C. under tension, is optimum in view of its laminatability with a metal sheet and formability.

The polyesters used as the adhesive are saturated polyesters comprised of a dicarboxylic acid component and a diol component, and have an intrinsic viscosity of at least about 0.4. The dicarboxylic acid component includes, for example, aromatic dicarboxylic acids such as terephthalic acid, isophthalic acid, phthalic acid and naphthalenedicarboxylic acid; and aliphatic dicarboxylic acids such as adipic acid, sebacic acid and azelaic acid. The diol component includes, for example, polymethylene glycol represented by the formula HO—$(CH_2)_n$—OH(n=2~10) such as ethylene glycol, propylene glycol, butanediol, hexanediol and decamethylene glycol; branched glycols represented by the formula HO—$CH_2$—$C(R)_2$—$CH_2$—OH (R=an alkyl group having 1 to 4 carbon atoms) such as neopentyl glycol; diethylene glycol and triethylene glycol, and; diols having a cyclohexane ring such as cyclohexane dimethanol.

Typical saturated polyesters used as the adhesive are PET, a copolyester of ethylene terephthalate/ethylene isophthalate (hereinafter abbreviated as "PET/I"), PBT, a copolyester of butylene terephthalate/ethylene isophthalate (hereinafter abbreviated as "PBT/I"), a copolyester of ethylene terephthalate/ethylene adipate (hereinafter abbreviated as "PET/A", a copolyester of ethylene terephthalate/ethylene sebacate (hereinafter abbreviated as "PET/S") and a copolyester of ethylene terephathalate/neopentyl terephalate. Of these saturated polyesters, PET, PBT, PET/I, and PBT/I are preferable.

The melting point of saturated polyesters is determined by using a differential scanning calorimeter (DSC) as follows. 10 mg of a polymer specimen, placed in a specimen holder, are maintained at a temperature which is approximately 20° C. higher than the expected melting point (which temperature is 280° C. in the case of PET), in a nitrogen atmosphere, for five minutes thereby to completely melt the polymer specimen. Then, the specimen holder is put in liquid nitrogen to quench the molten polymer specimen. Again, the solidified polymer specimen is heated at a constant rate of 10° C./minute to obtain a melting curve. The temperature at which the melting peak appears is taken as the melting point. In the case where the polyester is amorphous or there is no clear melting peak in the DSC melting curve due to the fact that the polyester exhibits a low rate of crystallization or a reduced crystallizability, the melting point of the polyester is determined by means of thermomechanical analysis as follows. A polymer specimen in the form of a tablet of about 5 mm diameter and 2 to 4 mm height is heat-treated at a temperature, which is approximately 20° C. lower than the expected melting point, in a nitrogen atmosphere, for approximately 20 hours. Then, the specimen is attached to a minute constant load thermal expansion meter "Thermoflex TMA", manufactured by Rigaku Denki K.K., and heated at a constant rate of 5° C./minute while an exactly columnar nickel pin of one mm diameter is pressed against the specimen at a load of one gram. The temperature, at which the nickel pin penetrates into the specimen to the depth of 250 microns, is taken as the melting point.

The melting points of typical saturated polyesters used as the adhesive are listed in Table I, below. It should be noted that the molar ratios of comonomers given in Table I are approximate values, and the melting point of the polyester varies not only upon the molar ratio but also upon the polymerization catalyst and the molecular weight of the polymer.

TABLE I

|  | PET/I | | PBT/I | | PET/S | | PET/A | |
|---|---|---|---|---|---|---|---|---|
|  | PET/I Molar ratio | Melting point (°C.) | PBT/I Molar ratio | Melting point (°C.) | PET/S Molar ratio | Melting point (°C.) | PET/A Molar ratio | Melting point (°C.) |
| High melting point polyester | 100/0 | 255 | 100/0 | 255 |  |  |  |  |
|  | 90/10 | 235 | 90/10 | 208 | 90/10 | 230 | 90/10 | 238 |
|  | 85/15 | 221 |  |  | 80/20 | 208 | 80/20 | 215 |
|  | 80/20 | 211 |  |  |  |  |  |  |
| Low melting point polyester | 70/30 | 170 | 80/20 | 190 | 70/30 | 170 | 70/30 | 180 |
|  | 60/40 | 136 | 70/30 | 175 | 60/40 | 140 | 60/40 | 150 |
|  | 50/50 | 120 | 65/35 | 160 |  |  |  |  |
|  |  |  | 50/50 | 140 |  |  |  |  |
|  |  |  | 40/60 | 130 |  |  |  |  |

The high melting point polyester used refers to a crystalline polyester which has a melting point of at least 200° C. The high melting point polyester includes, for example, PET, PET/I (molar ratio of ethylene terephthalate/ethylene isophthalate=at least about 75/25), PBT and PBT/I (molar ratio of butylene terephthalate/butylene isophthalate=at least about 85/15). The high melting point polyesters may be used either alone or in combination. If a polyester having a melting point of lower than 200° C. is used, a film-heat-bonded metal sheet of the intended polyblending properties cannot be obtained. When the amount of the high melting point polyester is below 5% by weight based on the total weight of the high melting point polyester and the low melting point polyester, a polyester protective coating film tends to have wrinkles and bubbles, entrapped between the film and the metal sheet, upon pressing in the step of laminating the metal sheet with the film, and furthermore, the film is liable to shrink upon heating to the heat bonding temperature in the laminating step. Moreover, when the resulting container is subjected to retort treatment, the protective coating film is delaminated from the container in the portion which has been subjected to a high ratio of deformation in the forming step. In contrast, when the amount of the high melting point polyester exceeds 80% by weight, the adhesive exhibits poor adhesion, and the polyester in the adhesive is crystallized to an undesirably increased extent in the step of printing thus leading to reduction in formability. The protective coating film tends to be cracked or crazed particularly in the drawing processing step, and the resulting container becomes poor in corrosion resistance.

The low melting point polyester used refers to one which has a melting point of at least 100° C. but not higher than a temperature which is 5° C. lower than the melting point of the high melting point polyester. Such a low melting point polyester usually has little or no crystallizability. If a polyester having a melting point higher than a temperature which is 5° C. lower than the melting point of the high melting point polyester is used, the resulting adhesive exhibits poor adhesion. If a polyester having a melting point of below 100° C. is used, a polyester protective coating film tends to be delaminated from the container when the container is heated. Polyesters having a low crystallizability are preferable in view of the corrosion resistance, and include, for example, PET/I (molar ratio of ethylene terephthalate/ethylene isophthalate=about 73/27 to about 50/50) and PBT/I (molar ratio of butylene terephthalate/butylene isophthalate=about 83/17 to about 40/60). The low melting point polyesters may be used either alone or in combination. When the amount of the low melting point polyester is below 20% by weight based on the total weight of the high melting point polyester and the low melting point polyester, the film-heat-bonded metal sheet after printing exhibits poor formability, and the protective coating film tends to be cracked or crazed particularly in the drawing processing step. The resulting container is poor in corrosion resistance. In contrast, when the amount of the low melting point polyester exceeds 95% by weight, a polyester protective coating film tends to have wrinkles and bubbles in the laminating step, and tends to be marred in the printing step. Furthermore, the resulting container becomes poor in adaptability to retort treatment.

The polyester polyblend adhesive used preferably contains a polyolefin in an amount of not larger than 35 parts by weight, more preferably not larger than 30 parts by weight, based on 100 parts by weight of the polyester. The blending of a polyolefin controls the thermal crystallization of the polyester in the adhesive and enhances formability of the polyester film-heat-bonded metal sheet (particularly printed metal sheet), adhesive strength, even after a heat treatment such as retort, and steaming treatment. Furthermore, the blending of a polyolefin enhances corrosion resistance of the container and, thus, enables the prolonged storage of a corrosive material.

The polyolefin to be blended with the polyester polyblend includes, for example, ionomers, modified polyolefins and copolymers of ethylene with $\alpha,\beta$-unsaturated monocarboxylic acid esters. The ionomers used are copolymers of an $\alpha$-olefin with ionic salts of $\alpha,\beta$-unsaturated carboxylic acid, containing a metal ion having a valency of 1 to 3. The $\alpha,\beta$-unsaturated carboxylic acid includes, for example, methacrylic acid, acrylic acid, maleic acid and itaconic acid. The metal ion includes, for example, sodium, potassium, lithium, zinc, magnesium, calcium and aluminium. The most preferable ionomers are copolymers of ethylene with 1 to 20% by mole, particularly 2 to 15% by mole, of methacrylic acid; 15 to 80%, particularly 25 to 65%, of the carboxyl groups in each copolymer being neutralized with zinc or magnesium, particularly with zinc. The remainder of the carboxyl groups may be partially esterified with a lower alcohol. When these ionomers are used in an amount of 5 to 30 parts by weight, particularly 10 to 25 parts by weight, based on 100 parts by weight of the polyester, the following advantages are obtained in addition to the advantages mentioned above. That is, the impact resistance of the container is enhanced and the corrosion resistance, particularly sulfide blackening resistance, of the container used for canning fish meat is enhanced.

By the term "modified polyolefins" used herein we mean graft copolymers prepared by a process wherein polyolefins such as polyethylene, polypropylene, a propylene/ethylene copolymer, polybutene and an ethylene/vinyl acetate copolymer are graft-polymerized with at least one monomer selected from $\alpha,\beta$-unsaturated carboxylic acids and their functional derivatives. The $\alpha,\beta$-unsaturated carboxylic acids include, for example, maleic acid, fumaric acid, itaconic acid, acrylic acid and methacrylic acid, and their functional derivatives which are acid anhydrides, esters, amides, imides, sulfoalkyl esters and sulfoaryl esters. Preferable modified polyolefins are prepared by graft-polymerizing polyethylene or polypropylene with maleic anhydride or acrylic acid in an amount such that the graft copolymer contains not more than 4% by mole, particularly not more than 2% by mole, of the graft monomer component. Some of the modified polyolefins are commercially available, for example, under the trade names of "ADMER", supplied by Mitsui Petrochemical Co., and "MODIC", supplied by Mitsubishi Yuka K. K.

By the term "copolymers of ethylene with $\alpha,\beta$-unsaturated monocarboxylic acids esters" used herein we mean copolymers of ethylene with at least one ester prepared from an $\alpha,\beta$-unsaturated carboxylic acid and a saturated aliphatic alcohol, said ester being represented by the formula:

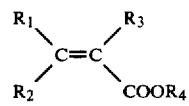

wherein $R_1$, $R_2$ and $R_3$ are independently H or an alkyl group having 1 to 3 carbon atoms and $R_4$ is an alkyl group having 1 to 12 carbon atoms. Preferable copolymers are comprised of 50 to 99% by weight, particularly 70 to 95% by weight, of ethylene and the remainder of a methyl or ethyl ester of acrylic or methacrylic acid. One example of such copolymers is "EEA copolymer", a copolymer of ethyl acrylate/ethylene supplied by Nihon Unicar Co.

If desired, the biaxially oriented polyester film and the polyester polyblend adhesive may have incorporated therein suitable amounts of additives such as antioxidants, thermal stabilizers, viscosity modifiers, plasticizers, adhesion enhancing agent, nucleating agents, finely divided inorganic particles and metal powders such as aluminum, organic lubricants, pigments and dyes. One preferable additive is titanium dioxide. By the incorporation of 0.3 to 7% by weight, preferably 1 to 3% by weight of titanium dioxide, the formability and corrosion resistance of the polyester film-heat-bonded metal sheet are enhanced. The biaxially oriented polyester film and the polyester polyblend adhesive may also have incorporated therein one or more polymers for imparting to the polyester film or the polyblend adhesive, for example, a plasticizing effect or adhesion enhancing effect. The amount of the polymers to be incorporated may be suitably determined, provided that the objects of the invention are not substantially influenced.

Usually, the biaxially oriented polyester film is in a direct contact with a layer of the adhesive. However, a thin layer of an adhesion-enhancing material, an anchor coat layer or an electrical discharge-treated layer may be interposed therebetween.

The thickness of the biaxially oriented polyester film, the thickness of the polyester polyblend adhesive layer and the proportion of these two thicknesses may be varied depending upon the intended container. Usually, the total thickness of the biaxially oriented film and the adhesive layer is in the range of from about 5 to 500 microns. In the case where the container is formed by drawing processing, the total thickness of the two layers is preferably in the range of from about 10 to 100 microns, particularly about 15 to 50 microns in view of the formability. The thickness of the biaxially oriented film is usually in the range of from about 10 to 100 microns, preferably from about 15 to 50 microns. If the closure is formed and intended to be used in applications where a high corrosion resistance is required, the thickness of the biaxially oriented film may exceed about 100 microns, but in the most applications, in the range of from about 10 to 100 microns, preferably from about 15 to 50 microns. The thickness of the binder layer varies mainly depending upon the surface roughness of the metal sheet. However, when the metal sheet is of a relatively smooth surface, the thickness of the adhesive layer may be at least about two microns for the desired adhesion, at least about three microns for the desired adaptability to retorting treatment, and more preferably at least about five microns. Thus, the ratio in thickness of the biaxially oriented film to the adhesive layer may be in the range of 1/0.05~1/5, preferably from 1/0.1 to 1/3, and more preferably from 1/0.4 to 1/2.5.

As the metal sheets, those which are used as materials for containers, may be used, such as iron, aluminum and copper. Of these, steel sheets are preferable, which include, for example, untreated steel sheets (i.e., black plates), tinplates, galvanized steel sheets, electrolytically chromated steel sheets and chemically treated steel sheets such as phosphatized steel plates and chromated steel plates. Of these, chemically treated steel sheets and electrolytically chromated steel sheets are the most preferable from considerations of cost and corrosion resistance of the containers. The thickness of the metal sheets may be usually in the range of from 0.01 to 5 mm, more preferably from 0.1 to 0.5 mm.

The polyester film-heat-bonded metal sheets of the invention may be prepared by one of the following methods (i), (ii) and (iii).

(i) First, a composite film comprised of the biaxially oriented polyester film and the polyester polyblend adhesive layer is prepared and, then, the metal sheet is laminated with the composite film.

(ii) First, the biaxially oriented polyester film and the polyester polyblend adhesive film are separately prepared. Thereafter, a pre-heated metal sheet is laminated with the polyester polyblend adhesive film and, then, with the biaxially oriented polyester film.

(iii) First, the polyester polyblend adhesive is extruded onto the metal sheet by means of extrusion lamination and, then, the biaxially oriented polyester-film is laminated on the adhesive-coated sheet.

Among the above-mentioned three methods, the method (i) is the most preferable in view of the lamination workability and yield.

The composite film may be prepared by (a) co-extruding the polyester to be formed into the biaxially oriented film and the polyester polyblend, and biaxially stretching and then heat-setting the co-extruded film; (b) extruding the polyester polyblend onto the non-oriented or uniaxially stretched polyester film by means of extrusion lamination, and then, stretching and then heat-setting the obtained composite film, or; (c) extruding the polyester polyblend onto the biaxially oriented polyester film by means of extrusion lamination.

A typical example of the method for preparing the biaxially oriented polyester film-heat-bonded metal sheet will now be illustrated with reference to a metal sheet having a biaxially oriented PET film heat-bonded thereto.

In a first method, a composite film comprised of the biaxially oriented PET film and the polyester polyblend adhesive-layer is supplied onto a metal sheet, which is maintained at a temperature of at least the sticking temperature of the polyester polyblend adhesive, usually at a temperature of 80° to 250° C., more preferably 90° to 200° C., and continuously moved. The supplied composite film is pre-bonded to the metal sheet under a pressure of 1 to 100 kg/cm, preferably 5 to 50 kg/cm. This step is called the "prebonding step". Thereafter, the pre-bonded composite film-metal sheet is re-heated to a temperature higher than the prebonding temperature, usually to a temperature of 200° to 250° C., preferably 210° to 240° C., thereby to complete the bonding. This step is called the "primary bonding step". The primary bonding may be effected either with or without applying a pressure. Finally, the film-heat-bonded metal sheet is quenched to a temperature at least 30° C. lower than the sticking temperature of the polyester polyblend adhesive.

In a second method, the composite film is bonded to the metal sheet in one single step. That is, the composite film is bonded under pressure to the metal sheet, which has been previously heated to a temperature similar to that employed in the primary bonding step in the first method, followed by quenching the film-heat-bonded metal sheet.

The first method is advantageous over the second method in view of the laminating workability. In both methods, the primary bonding temperature is crucial because it exerts influence upon the formability of the film-heat-bonded metal sheet and corrosion resistance of the container. When the primary bonding temperature is higher than the melting point of the biaxially oriented PET film, the molecular orientation of PET disappears and, thus, the formability is reduced. Particularly, when the film-heat-bonded metal sheet is subjected to drawing processing after the printing step, cracks are formed in the highly drawn wall portion of the container, and microcracks and crazings are formed in the concentric beaded portion of the bottom of the container.

The film-heat-bonded metal sheet of the present invention may be formed into containers as follows. First, the film-heat-bonded metal sheet is blanked into a desired shape, such as disc, ellipse, rectangular and square. The blank of the desired shape is subjected to drawing processing using a draw die and a punch thereby to obtain a shallow drawn article of a cup-shape. The drawing processing may be carried out at a drawing ratio of from 1.1 to 3.0, preferably 1.2 to 2.8. The cup-shaped shallow drawn article may be used as it is as a side seamless container.

A deep drawn container having a high ratio of wall height/bottom diameter can be obtained by drawing the cup-shaped shallow drawn article by using a redraw die of a small diameter and a redraw punch. If desired, the drawing may be repeated.

In the redrawing processing step, the shallow drawn cup can be ironed to some extent by adjusting the clearance between the draw die and the punch. The deeply drawn container can be further ironed by using an ironing draw die and an ironing punch. The ironing ratio may be varied by adjusting the clearance between the draw die and the punch, and are preferably in the range of from 10 to 50%.

Metal closures for a container may be formed from the film-heat-bonded metal sheet of the invention as follows. The film-heat-bonded metal sheet is blanked into a disc or another shape. The disc-shaped blank is formed into metal closures such as, for example, screw caps, vapor vacuum caps, anchor caps, phoenix caps, crown caps, pilfer proof caps, peel-off caps, and can ends may be formed by conventional forming techniques such as, for example, drawing processing, press processing, bead processing, roll processing and score processing.

Illustrations of the containers formed from the film-heat-bonded adhered metal sheet are food cans, beverage cans, oil cans, confectionary cans, coffee cans, tea cans and other general cans and closures of these cans.

The advantages of the film-heat-bonded metal sheet of the present invention, which has a polyblend adhesive layer comprised of at least one high melting point polyester and at least one low melting point polyester, are summarized as follows.

(i) The film-heat-bonded metal sheet exhibits good formability and is suitable for drawn containers, particularly printed drawn containers. The containers are excellent in corrosion resistance. If the adhesive layer is comprised of only a high melting point polyester or polyesters, the protective coating film is liable to be crazed or delaminated from the metal sheet in the drawing step or in the step wherein an impact force is applied to the metal sheet, such as the blanking step or the bending and folding step. Such crazing and delamination lead to reduction in adhesion and corrosion resistance. If the adhesive layer is comprised of only a low melting point polyester or polyesters, film burr occurs in the protective coating film in the blanked sheet, which burr causes some troubles in the drawing step.

(ii) Thermal crystallization of the polyester in the polyblend adhesive proceeds only at a reduced rate in the printing step and, therefore, the printed metal sheet still possesses good formability. If the adhesive layer is comprised of only a high melting point polyester or polyesters, thermal crystallization of the polyester proceeds at a rapid rate, and therefore, the printed metal sheet is poor in formability, particularly in drawability. If adhesive resin is comprised of only a low melting point polyester or polyesters, the adhesive is softened and ready to be fluidized in the printing step, and the protective coating film formed thereon is liable to be marred during the transportation of the coated metal sheet in the manufacturing process.

(iii) Even when the resulting container is heat-treated, e.g., subjected to boiling, steaming, or retort treatment, good adhesion of the protective coating film to the metal sheet can be maintained, and thus, the corrosion resistance is good. If the adhesive resin is comprised of only a high melting point polyester or polyesters, thermal crystallization of the adhesive layer proceeds when the container is heat-treated. Such the thermal crystallization leads to the reduction in adhesion, the delamination of the protective coating film and the reduction in corrosion resistance. If the adhesive is comprised of only a low melting point polyester or polyesters, the adhesive layer is softened when heat-treated, and thus, its adhesion is reduced. Consequently, the protective coating film is liable to be delaminated from the container in the portion which has been subjected to a high ratio of deformation in the forming step.

(iv) Containers with prolonged storage life, such as food cans, do not corrode even after prolonged storage. It is presumed that this is due to an interaction of the barrier property of the high melting point and highly crystalline polyester with the enhanced adhesion of the low melting point polyester. If the adhesive layer is comprised of only a high melting point polyester or polyesters, the protective coating film is readily locally delaminated from the container when the container is dropped. Thus, the container corrodes in the location where the film is delaminated, and the corrosion spreads out. If the adhesive layer is comprised of only a low melting point polyester or polyesters, the containers are liable to corrode after the prolonged storage because of little or no crystallinity of the polyester adhesive.

(v) The polyblend adhesive layer exhibits good laminatability to a metal sheet. Namely, neither wrinkles nor bubbles are formed when the protective coating film is pressed against a pre-heated metal sheet by means of, e.g., a press roll. When only a high melting point polyester or polyesters are used, the adhesive exhibits poor adhesion to the metal sheet. In contrast, when only a low melting point polyester is used, the adhesive layer becomes softened, sticky and elongated when pressed against the pre-heated metal sheet and, thus, wrinkles and bubbles are formed. Furthermore, a low melting point polyester can not prevent thermal shrinkage of the biaxially oriented polyester film and, thus, the resulting metal sheet has no protective coating in the narrow marginal portion.

The invention will be further illustrated by the following examples wherein parts and percents are by weight unless otherwise specified.

Characteristics of film-heat-bonded metal sheets and containers were evaluated as follows.

(i) Laminatability

A composite film comprised of a biaxially oriented polyester film and a polyester polyblend adhesive layer is superposed on a double cold-reduced low carbon steel sheet 0.17 mm in thickness, and degreased by using trichloroethylene, or its electrolytically chromated product. The composite film is pre-bonded to the steel sheet at a temperature of 90° to 150° C. by using a press roll. Thereafter, the obtained laminate is heated in an oven maintained at a temperature of 200° to 250° C. for 90 seconds, thereby to complete the bonding, and then, quenched in water. Film-heat-bonded metal sheets of two types are prepared, one of which has a protective coating on one side thereof and the other of which has protective coatings on both sides thereof. The laminatability is evaluated in terms of (a) bubble and wrinkle formation, and (b) thermal shrinkage, both of which are expressed in three ratings as follows.

(a) Bubble and wrinkle formation

A: no bubble nor wrinkle formed.

B: two or three bubbles and/or wrinkles formed per 10 m$^2$.

C: many bubbles and wrinkles formed.

(b) Thermal shrinkage

A: shrinkage is less than 2%.

B: shrinkage is at least 2% and less than 5%.

C: shrinkage is at least 5%.

(ii) Formability (drawability)

A white ink of an acrylic resin is applied onto a non-film-bonded surface of a film-heat-bonded steel sheet at a coating thickness of 100 mg/dm² and, then, baked in an oven maintained at a temperature of 190° C. for 10 minutes, and allowed to cool to ambient temperature. Thereafter, a blue ink is applied onto the white coating by using a tandem printing machine, baked at a temperature of 150° C. for 10 minutes and, then, allowed to cool. Similarly, a yellow ink is applied thereto, baked and, then, allowed to cool to ambient temperature. Finally, a finishing varnish is coated thereon, baked at a temperature of 175° C. for 10 minutes and, then, allowed to cool to ambient temperature. The printed steel sheet, so obtained, is blanked into a disc 156.5 mm in diameter. The disc-shaped blank is subjected to a two stage drawing processing in a manner such that the printed surface is on the outside, thereby to obtain a side seamless can having a diameter of 83 mm and a height of 46 mm, and having a concentric beaded portion on the bottom.

The formability is expressed in three ratings as follows.

A: no wrinkle formed in the steel sheet and no crazing nor fault formed in the protective coating film.

B: wrinkles formed in portions of the steel sheet, and crazing formed in portions of the highly drawn wall portion and in portions of the concentric beaded portion of the bottom.

C: many wrinkles formed in the steel sheet, cracks formed in the protective coating film and the coating film delaminated.

(iii) Corrosion resistance and adhesion

Tunny seasoned with soy sauce, salmon boiled in water and tunny seasoned with vinegar dressing are separately packed in cans. Each can is double-seamed with a can end and, then, retorted at a temperature of 120° C. for 90 minutes. The can is subjected to an accelerated storage test. Namely, the can is stored at a temperature of 50° C. for a predetermined period (6 or 10 months). Then, the can is opened and the state of corrosion development is observed, and the adhesion of the protective coating film is evaluated. Both the corrosion resistance and the adhesion are expressed in four ratings as follows.

(a) Corrosion resistance

AA: no corrosion or discoloration observed.

A: slight discoloration observed only in the boundary between the liquid and gas phases of the content. The content is acceptable.

B: blisters formed due to corrosion in the wall portion and in the concentric beaded portion on the bottom.

C: Corrosion developed over the entire surface.

(b) Adhesion

AA: film bonded firmly even when the film is cross cut into squares.

A: adhesion of film reduced to some extent when the film is cross cut into squares.

B: film delaminated when the film is cross cut into squares.

C: film delaminated even when the film is not cross cut into squares.

In the following examples, the intrinsic viscosity of polyester was measured at a temperature of 25° C. in o-chlorophenol. The abureviations used for copolyesters are as follows.

PET/I: copolyester of ethylene terephtalate/ethylene isophthalate.

PBT/I: copolyester of butylene terephthalate/butylene isophthalate.

PET/S: copolyester of ethylene terephthalate/ethylene sebacate.

P(NPG/EG)(T/I): copolyester of neopentyl or ethylene terephthalate/neopentyl or ethylene terephthalate.

EXAMPLE 1

PET having an intrinsic viscosity of 0.62, PET/I (molar ratio=85/15) having an intrinsic viscosity of 0.88, PET/I(molar ratio=60/40) having an intrinsic viscosity of 0.90 and PBT/I(molar ratio=65/35) having an intrinsic viscosity of 1.0 were prepared as adhesive components. Each of the adhesive compositions listed in Table II, below and PET were co-extruded to obtain a non-oriented composite film having a thickness of 230 microns. The composite film was stretched 3.3 times its original length in the longitudinal direction, at a temperature of 80° C. in a conventional manner by using a roller-type stretcher. Then, the film was stretched 3.5 times its original width in the transverse direction, at a temperature of 90° C., by using a tenter, and thereafter, heat-set at a temperature of 235° C. under tension. The stretched composite film had a total thickness of 20 microns. The thicknesses of the biaxially oriented PET film layer and the polyester polyblend layer were 12 microns and 8 microns, respectively.

The composite film was superposed on a double cold-reduced and electrolytically chromated steel of 0.17 mm in thickness so that the adhesive layer side of the film faced the steel sheet. The film was pre-bonded to the steel sheet at a temperature of 140° C. under a pressure of 15 kg/cm. Thereafter, the film-pre-bonded steel sheet was maintained at a temperature of 230° C. without applying any pressure thereto to complete the bonding. The film-bonded steel sheet was cooled with water to obtain a laminated steel sheet. The laminated steel sheet was printed on the side opposite to the composite film-bonded side and, thereafter, formed by drawing processing into side seamless cans. Similarly, can ends were formed from an electrolytically chromated steel sheet 0.21 mm in thickness. Salmon boiled in water and tunny seasoned with a vinegar dressing were separately packed in the cans. The fish meat-packed cans were seamed and, then, subjected to retort treatment. A part of the fish meat-packed cans were dropped from a height of 50 cm onto linoleum flooring, thereby to dent a portion of each can.

Characteristics of the film-heat-bonded steel sheet and the cans are shown in Table II, below. As is seen from Table II, the film-heat-bonded metal sheets of the invention (Run No. 1 through 4) exhibited good corrosion resistance i.e., resisted highly corrosive acidic food such as tunny seasoned with a vinegar dressing. The protective coating film was not delaminated even in the dented portion of each packed can, i.e., the metal sheets of the invention exhibited good impact resistance. In contrast, the film-heat-bonded metal sheets (Run Nos. 5 and 6) having an adhesive layer comprised of a single polyester were not satisfactory in all characteristics.

TABLE II

| Item | Run No. 1 | 2 | 3 | 4 | Comparative Example 5 | 6 |
|---|---|---|---|---|---|---|
| Composition of polyblend adhesive (wt %) | | | | | | |
| High melting point polyester | | | | | | |
| PET | 10 | 20 | 20 | 30 | | |
| PET/I(85/15) | | | | | | 100 |
| Low melting point polyester | | | | | | |
| PET/I(60/40) | | | 30 | 50 | | |
| PBT/I(65/35) | 90 | 80 | 50 | 20 | 100 | |
| Laminatability | | | | | | |
| Bubble & wrinkle formation | A | A | A | A | B | B |
| Thermal shrinkage | A | A | A | A | C | B |
| Formability | A | A | A | A | B | C |
| Salmon boiled in water (50° C. 10 months) | | | | | | |
| Corrosion resistance | A | AA | AA | AA | C | C |
| Adhesion | AA | AA | AA | AA | B | B |
| Tunny seasoned with vinegar dressing (50° C. 6 months) | | | | | | |
| Rust prevention | A | AA | AA | AA | C | C |
| Adhesion | A | AA | AA | AA | B | C |

COMPARATIVE EXAMPLE 1

A polyester polyblend adhesive composition similar to that of Run No. 4 in Example 1 was melt-extruded by a conventional procedure to obtain a non-oriented film 20 microns in thickness. Using this film, laminated steel sheets and side seamless cans were formed in manners similar to those employed in Example 1. The side seamless cans had crazings in portions of the wall portion and in portions of the concentric beaded portion of the bottom, i.e., the rating for formability was B.

The cans were packed with tunny seasoned with a vinegar dressing and, then, subjected to retort treatment. After a three month storage at a temperature of 50° C., the packed cans were opened. The entire inner surface of each can was corroded (the rating for corrosion resistance was C) and the protective coating film was delaminated in the wall portion of each can (the rating for adhesion was C).

EXAMPLE 2

PET and copolyesters, which were similar to those used in Example 1, were prepared as adhesive components. Furthermore, PBT/I (molar ratio = 80/20) having an intrinsic viscosity of 1.10, PET/I(molar ratio = 80/20) having an intrinsic viscosity of 0.93 and P(NPG/EG) (T/I) [molar ratio of terephthalic acid-/isophthalic acid = 55/45] [molar ratio of neopentyl glycol/ethylene glycol = 60/40] having a melting point of 115° C. were also prepared as adhesive components. Each of the binder compositions listed in Table III, below, and PET were co-extruded to obtain a non-oriented composite film having a thickness of 320 microns. The non-oriented composite film was stretched 3.5 times its original length in the longitudinal direction and 3.5 times its original width in the transverse direction in a conventional manner and, then, heat-set at a temperature of 235° C. under tension. The drawn composite film had a total thickness of 26 microns. The thicknesses of the biaxially oriented PET film layer and the polyester polyblend adhesive layer were 16 microns and 10 microns, respectively.

The composite film was superposed on a double cold-reduced and electrolytically chromated steel sheet 0.17 mm in thickness so that the polyblend adhesive layer side of the composite film faced the steel sheet. The composite film was pre-bonded to the steel sheet at a temperature of 150° C. under a pressure of 20 kg/cm. Thereafter, the film-pre-bonded steel sheet was maintained at a temperature of 220° C. without applying any pressure thereto to complete the bonding. The film-bonded steel sheet was cooled with water to obtain a laminated steel sheet. The laminated steel sheet was printed on the side opposite to the composite film-bonded side and, thereafter, formed into side seamless cans. Similarly, film-heat-bonded and printed closures were formed from an electrochemically chromated steel sheet 0.21 mm in thickness. Salmon boiled in water and tunny seasoned with a vinegar dressing were separately packed in the cans. The fish meat-packed cans were seamed and, then, subjected to retort treatment. A part of the cans were dropped to dent a portion of each can in a manner similar to that in Example 1.

Characteristics of the film-heat-bonded steel sheet and the cans are shown in Table III, below. The film-heat-bonded metal sheets of the invention (Run Nos. 8 through 12) were satisfactory in laminatability, formability, corrosion resistance and adhesion. Their impact resistances were also satisfactory, and neither corrosion nor film delamination was observed in their dented portions. In contrast, the film-heat-bonded metal sheet (Run No. 13) having an adhesive layer containing an excessive amount of a high melting point polyester exhibited poor formability, and cracks were formed in a portion of the highly drawn wall portion and crazing occurred in the concentric beaded portion of the bottom. The fish meat-packed cans of Run No. 13 corroded in such faulty portions and were poor in impact resistance.

TABLE III

| Item | Run No. 8 | 9 | 10 | 11 | Comparative Example 12 | 13 |
|---|---|---|---|---|---|---|
| Composition of polyblend adhesive (wt %) | | | | | | |
| High melting point polyester | | | | | | |
| PET | 10 | 20 | 20 | 20 | 20 | 20 |

TABLE III-continued

| Item | Run No. 8 | 9 | 10 | 11 | 12 | Comparative Example 13 |
|---|---|---|---|---|---|---|
| PET/I(85/15) | 30 | 30*¹ | 50*¹ | 60 | | 70 |
| Low melting point polyester | | | | | | |
| PBT/I(65/35) | 60 | | | | 70 | 10 |
| PBT/I(80/20) | | 50 | 30 | 20 | 10*² | |
| Laminatability | | | | | | |
| Bubble & wrinkle formation | A | A | A | A | A | A |
| Thermal shrinkage | A | A | A | A | A | A |
| Formability | A | A | A | A ~ B*³ | A | C |
| Salmon boiled in water (50° C. 10 months) | | | | | | |
| Corrosion resistance | AA | AA | AA | AA | AA | C |
| Adhesion | AA | AA | AA | AA | AA | C |
| Tunny seasoned with vinegar dressing (50° C. 6 months) | | | | | | |
| Corrosion resistance | AA | AA | AA | AA ~ A | A | C |
| Adhesion | AA | AA | AA | AA | A | A |

*¹PET/I(80/20)
*²P(NPG/EG)(T/I)(60/40)(55/45)
*³A part of the wall portion was crazed, but the crazing disappeared upon retort treatment.

COMPARATIVE EXAMPLE 2

30 parts of PET similar to that used in Example 1 and 70 parts of PET/S(molar ratio=40/60) having a melting point of 98° C. and an intrinsic viscosity of 0.70 were blended together to obtain a polyester polyblend adhesive. The polyblend adhesive and PET were coextruded in a manner similar to that mentioned in Example 2, to obtain a non-oriented composite film having a thickness of 320 microns. The non-oriented composite film was stretched 3.5 times its original length in the longitudinal direction and, simultaneously therewith, 3.5 times its original width in the transverse direction at a temperature of 80° C. and then, heat-set at a temperature of 235° C. under tension. The stretched composite film had a total thickness of 26 microns. The thicknesses of the PET film layer and the polyblend adhesive layer were 16 microns and 10 microns, respectively. Using this composite film, a laminated steel sheet and side seamless cans were formed in manners similar to those employed in Example 2. Many wrinkles and bubbles were formed in the laminating step (the rating for laminatability was C). The thermal shrinkage was 15% (the rating for the shrinkage was C). The resultant side seamless cans were faulty. When the fish meat-packed cans were opened, film delamination in the highly drawn wall portion was observed.

EXAMPLE 3

Polyester polyblend adhesive compositions, listed in Table IV, below, were prepared from the following polymers.

| | Molar ratio | Intrinsic viscosity |
|---|---|---|
| PET | — | 0.65 |
| PET/I | 85/15 | 0.90 |
| PET/I | 70/30 | 0.92 |
| PET/I | 60/40 | 0.94 |
| PBT/I | 70/30 | 1.10 |
| PBT/I | 65/35 | 1.11 |

"Surlyn" 1706 (Zn type, melt index 0.7 g/10 min., supplied by Du Pont).

PET having an intrinsic viscosity of 0.62 was melt-extruded in a conventional manner into a non-oriented film. The non-oriented film was stretched 3.5 times its original length in the longitudinal direction, and subsequently, 3.7 times its original width in the transverse direction and, then, heat-set at a temperature of 235° C. under tension to obtain a biaxially oriented PET film 16 microns in thickness. Each of the polyester polyblend adhesive compositions was melt-extruded onto the biaxially oriented PET film by an extrusion laminating procedure to form a composite film having a polyester polyblend adhesive layer 15 microns in thickness.

The composite film was pre-bonded at a temperature of 140° C. under a pressure of 10 kg/cm to a double cold-reduced and electrolytically chromated steel sheet 0.17 mm in thickness. The pre-bonded steel sheet was maintained at a temperature of 230° C. without applying any pressure thereto to complete the bonding and, then, cooled with water to obtain a laminated steel sheet. The laminated steel sheet was printed on the side opposite to the composite film-bonded side and, thereafter, formed into side seamless cans. Similarly, closures were formed from a steel sheet similar to that mentioned above but having a thickness of 0.21 mm. Salmon boiled in water and tunny seasoned with a vinegar dressing were separately packed in the cans, and their prolonged storage tests were conducted in a manner similar to that in Example 1.

Characteristics of the film-heat-bonded steel sheet and the cans are shown in Table IV, below. In the preparation of the film-heat-bonded steel sheets of Run Nos. 15 through 20, the lamination speed could be enhanced without formation of wrinkles and bubbles, as compared with the case where polyester polyblend binder compositions similar to those of Run Nos. 15 through 20 but containing no "Surlyn" were used. It has been found from the comparison of Run No. 20 in Table IV with Run No. 11 in Table III that the polyester polyblend adhesive composition containing "Surlyn" results in a laminated steel sheet of improved formability as compared with that obtained from a similar adhesive composition containing no "Surlyn". Furthermore, the film-heat-bonded steel sheets of the invention (Run Nos. 15 through 20) exhibited good corrosion resistance in the prolonged storage test. It is to be noted that the film-heat-bonded steel sheet of Run No. 20 exhibited excellent corrosion resistance (the rating therefor was AA) in the storage test wherein tunny seasoned with a vinegar dressing was stored at 50° C. for 10 months. The film-heat-bonded steel sheet of Run No. 11 (containing no "Surlyn") had a rating for corrosion resistance of between A and B in the same storage test. This means that the blending of "Surlyn" with the polyester polyblend adhesive enhances the corrosion resistance.

The film-heat-bonded steel sheet of Run No. 21, having a polyester polyblend adhesive layer containing an excessive amount of a high melting point polyester, exhibited poor formability. The film-heat-bonded steel sheet of Run No. 22, having a polyester polyblend adhesive layer comprised only of a low melting point polyester, was poor in laminatability.

then, cooled with water. The laminated steel sheet, so obtained, was formed into side seamless cans. The cans were packed with tunny seasoned with soy sauce.

Characteristics of the film-heat-bonded steel sheet and the cans are shown in Table V, below. As is seen from Table V, the film-heat-bonded metal sheets of the invention (Run Nos. 23, 24 and 25) exhibited good formability and corrosion resistance. In contrast, the film-heat-bonded metal sheet of Run No. 26, having a polyester polyblend adhesive layer containing an exces-

TABLE IV

| Item | Run No. | | | | | | Comparative Example | |
|---|---|---|---|---|---|---|---|---|
| | 15 | 16 | 17 | 18 | 19 | 20 | 21 | 22 |
| Composition of polyblend adhesive Polyester[*1] (wt. %) | | | | | | | | |
| High melting point polyester | | | | | | | | |
| PET | 12 | 25 | 25 | 35 | 25 | 20 | 20 | |
| PET/I(85/15) | | | | | 35 | 60 | 65 | |
| Low melting point polyester | | | | | | | | |
| PET/I(60/40) | 48 | | 50 | | | | | 45[*2] |
| PBT/I(65/35) | 40 | 75 | 25 | 65 | 40 | 20 | 15 | 55[*3] |
| Surlyn (parts) | 18 | 25 | 25 | 18 | 18 | 18 | 18 | 18 |
| Laminatability | | | | | | | | |
| Bubble of wrinkle formation | A | A | A | A | A | A | A | C |
| Thermal Shrinkage | A | A | A | A | A | A | A | C |
| Formability | A | A | A | A | A | A | C | C |
| Salmon boiled in water (50° C. 10 months) | | | | | | | | |
| Corrosion resistance | AA | AA | AA | AA | AA | AA | C | C |
| Adhesion | AA | AA | AA | AA | AA | AA | C | C |
| Tunny seasoned with vinegar dressing (50° C. 6 months) | | | | | | | | |
| Corrosion resistance | AA | AA | AA | AA | AA | AA | C | C |
| Adhesion | AA | AA | AA | AA | AA | AA | C | C |
| Tunny seasoned with vinegar dressing (50° C. 10 months) | | | | | | | | |
| Corrosion resistance | AA | AA ~ A | AA | AA ~ A | AA | AA | C | C |
| Adhesion | AA | AA | AA | AA | AA | AA | C | C |

[*1] Total amount of polyester is equal to 100 parts
[*2] PET/I(70/30)
[*3] PBT/I(70/30)

EXAMPLE 4

Polyester polyblend adhesive compositions listed in Table V were prepared from the polymers listed in Example 3 and the following polymers:

Modified polyolefin "Admer" NE 050 (polyethylene type, melt index 4 g/10 min., supplied by Mitsui Petrochemical Co.)

Modified polyolefin "Admer" QF 305 (polypropylene type, melt index 2.2 g/min., supplied by Mitsui Petrochemical Co.).

Ethylene/ethyl acrylate copolymer ("EEA" Copolymer DPDJ 6169, ethyl acrylate content 18 wt.%, melt index 6 g/10 min, supplied by Nihon Unicar Co.).

Each of the polyester polyblend adhesive compositions was melt-extruded onto a biaxially oriented PET film of 16 microns in thickness by an extrusion lamination technique in a manner similar to that mentioned in Example 3, to obtain a composite film having an adhesive layer of 10 microns and thus having a total thickness of 26 microns.

The composite film was superposed on a double cold-reduced and electrolytically chromated steel sheet 0.17 mm in thickness, which sheet was previously coated with a phenol-epoxy resin at a coating weight of 60 mg/dm$^2$, so that the adhesive layer side of the composite film faced the uncoated side of the steel sheet. The superposed composite film was pre-bonded to the steel sheet at a temperature of 140° C. under a pressure of 20 kg/cm. The pre-bonded steel sheet was maintained at a temperature of 230° C. to complete the bonding and, sive amount of a polyolefin exhibited poor formability.

TABLE V

| Item | Run No. | | | Comparative Example |
|---|---|---|---|---|
| | 23 | 24 | 25 | 26 |
| Composition of polyblend adhesive Polyester[*1] (wt %) | | | | |
| High melting point polyester PET | 25 | 25 | 25 | 25 |
| Low melting point polyester PBT/I (65/35) | 75 | 75 | 75 | 75 |
| Polyolefin (parts) | | | | |
| Surlyn | 10 | | 10 | |
| Others | 10[*2] | 15[*2] | 2[*3] | 37[*4] |
| Laminatability | | | | |
| Bubble & wrinkle formation | A | A | A | A |
| Thermal shrinkage | A | A | A | A |
| Formability | A | A | A | C |
| Tunny seasoned with soy sauce (50° C., 10 months) | | | | |
| Corrosion resistance | AA | AA | AA | C |
| Adhesion | AA | AA | AA | B C |

[*1] Total amount of polyester is equal to 100 parts.
[*2] Modified polyolefin "Admer" NE 050
[*3] "EEA" copolymer DPDJ 6169
[*4] Modified polyolefin "Admer" QF 300

EXAMPLE 5

Each of the composite films in Run Nos. 2, 9, 11, 15 and 20 in the preceding Examples was pre-bonded, at a temperature of 140° C. and at a pressure of 20 kg/cm, to both sides of a black plate degreased with trichloroethylene and having a thickness of 0.24 mm. The pre-bonded black plate was heated at a temperature of 230° C. to complete the bonding and, then, cooled with water. The laminated black plate, so obtained, was formed into screw caps 73 mm in diameter and 18 mm in height. No film separation was observed in the forming process. These caps were filled with mayonnaise and tomato puree, and covered by glass plates. After the caps were stored at a temperature of 50° C. for one month, the state of corrosion development was observed. No corrosion was observed in any of the above-mentioned Run Nos.

For comparison purposes, the above-mentioned procedure was repeated using the composite films in Run Nos. 6, 22 and 26. Rusting was observed in the screw portion of each cap.

EXAMPLE 6

Each of the composite films in Run Nos. 4, 8, 18 and 23 in the preceding Examples was pre-bonded to one side of an aluminum sheet 0.35 mm in thickness at a temperature of 150° C. and a linear pressure of 10 kg/cm. The pre-bonded aluminum sheet was heated at a temperature of 240° C. to complete the bonding and, then, cooled with water to obtain a laminated aluminum sheet. The non-film-adhered side of the aluminum sheet was coated with an epoxy-polyurea external laequer and, then, cured at a temperature of 195° C. for 10 minutes. The resin-coated laminated aluminum sheet was formed into easy open can ends 53 mm in diameter by a conventional procedure.

A tinplate 0.23 mm in thickness was coated with a phenol-epoxy resin internal coating. Can bodies 53 mm in diameter and 133 mm in height were formed from the resin-coated tinplate by using a solder, and then, packed with a coffee beverage. The coffee beverage packed can bodies were double seamed with the above-mentioned aluminum can ends and, then, subjected to retort treatment. After a storage of six months at a temperature of 50° C., the cans were opened. The can ends exhibited easy openability. No film delamination from the can ends or corrosion was observed.

For comparison purposes, the above-mentioned procedure was repeated using each of the composite films in Run Nos. 6 and 13. In the can end forming process, the protective coating film became crazed in the chuck wall radius portion thereof. After the six month storage, the can end could not easily be opened. Blistered corrosion was observed.

EXAMPLE 7

Each of the polyester polyblend adhesive compositions in Run Nos. 11, 20 and 21 in the preceding Examples was melt-extruded onto a biaxially oriented PET film 16 microns in thickness, by an extrusion laminating technique, to obtain a composite film having an adhesive layer 10 microns in thickness, and thus, having a total thickness of 26 microns. Each composite film was pre-bonded, at a temperature of 140° C. under a pressure of 10 kg/cm, to one side of a double cold-reduced and electrolytically chromated steel sheet 0.17 mm in thickness. The pre-bonded steel sheet was maintained at a temperature of 205° C. or 230° C., without applying any pressure thereto, to complete the bonding, and then, cooled with water to obtain a laminated steel sheet. The laminated steel sheet was printed on the side opposite to the composite film-bonded side and, thereafter, formed into side seamless cans.

These cans were packed with sardine and, then, the sardine-packed cans were steamed at 100° C., for 40 minutes, in an exhaust box. Thereafter, the cans were taken out from the exhaust box and the state of the film adhesion on the edge region of the flange portion in each can was observed.

In the film-heat-bonded steel sheet of Run No. 11, no film delamination was observed when the primary bonding was effected at a temperature of 230° C., but film delamination was slightly observed when the primary bonding was effected at a temperature of 205° C. In the steel sheet of Run No. 20, no film delamination was observed at the primary bonding temperatures of 230° C. and 205° C. In the sheel sheet of Run No. 21, having an adhesive layer containing an excessive amount of a high melting point polyester, film delamination occurred to a great extent at the primary bonding temperatures of 230° C. and 205° C. As is seen from the comparison of Run No. 11 with Run No. 20, the blending of "Surlyn" with the polyester polyblend serves to enhance the film adhesion as measured after the steaming treatment.

EXAMPLE 8

Each of the polyester polyblend adhesive compositions in Run Nos. 11 and 12 in Example 2 was melt-extruded onto a biaxially oriented PET film 16 microns in thickness, containing 2.5% of titanium dioxide, by an extrusion laminating technique to obtain a composite film having an adhesive layer 10 microns in thickness and, thus, having a total thickness of 26 microns.

In a manner similar to that employed in Example 1, each composite film was laminated onto one side of an electrolytically chromated steel sheet. The film-laminated steel sheet was printed on the side opposite to the composite film-bonded side and, thereafter, formed by drawing processing into side seamless cans. Similarly, can ends were formed from a similar steel sheet. The laminated steel sheets of Run Nos. 11 and 12 exhibited good formability (the rating for formability was A).

Tunny seasoned with a vinegar dressing was packed in the cans and the tunny-packed cans were stored at a temperature of 50° C. for 10 months. No discoloration nor corrosion was observed on the inner surface of each can (the ratings for corrosion resistance and adhesion were AA). In order to evaluate the corrosion resistance of the steel sheet per se, without the influence due to the hiding effect of titanium dioxide, the amount of hydrogen generated in each can was measured. This measurement was carried out by sampling a predetermined amount of gas immediately after the can was opened and determining the amount of hydrogen present therein by gas chromatography. The measurement was repeated ten times in total and the obtained ten values were averaged. The amounts of hydrogen in Run Nos. 11 and 12 were 0.014 ml and 0.015 ml, respectively, which means that corrosion occurs only to a extremely negligible extent.

From a comparison of the above described characteristics with those in Run Nos. 11 and 12 in Example 2, wherein the rating for corrosion resistance was "A~B", as measured after 10 months of storage at 50° C., and the amounts of hydrogen were 0.045 ml and 0.046 ml, respectively, it will be apparent that the corrosion resistance can be enhanced by the incorporation of titanium dioxide into the biaxially oriented PET film.

Thus, the incorporation of titanium dioxide in the biaxially oriented polyester film improves not only the lubrication of the film (and, thus, enhances the formability), but also, the corrosion resistance. It now has been found that the corrosion resistance is improved by the addition of titanium dioxide to an extent larger than that expected from the hiding effect of titanium dioxide.

We claim:

1. A polyester film-heat-bonded metal sheet, which comprises a biaxially oriented polyester film or films, heat-bonded to a metal sheet by means of an adhesive layer interposed therebetween, said adhesive layer is made of a polyblend comprised of, based on the weight of the polyblend, 5 to 80% by weight of at least one high melting point polyester having a melting point of at least 200° C. and 20 to 95% by weight of at least one low melting point polyester having a melting point of at least 100° C., but not higher than a temperature which is 5° C. lower than the melting point of the high melting point polyester.

2. A polyester film-heat-bonded metal sheet according to claim 1, wherein the high melting point polyester has a melting point of at least 210° C. and the low melting point polyester has a melting point of at least 125° C., but not higher than a temperature which is 10° C. lower than the melting point of the high melting point polyester.

3. A polyester film-heat-bonded metal sheet according to claim 1 or 2, wherein the polyblend is comprised of, based on the weight of the polyblend, 10 to 70% by weight of the high melting point polyester and 30 to 90% by weight of the low melting point polyester.

4. A polyester film-heat-bonded metal sheet according to claim 1, wherein the or each biaxially oriented polyester film is made of a polyester having a glass transition temperature of at least 55° C. and a melting point of 220° C.

5. A polyester film-heat-bonded metal sheet according to claim 1 or 4, wherein the or each biaxially oriented polyester film is made of polyethylene terephthalate or copolyesters having at least 95% by mole of ethylene terephthalate units.

6. A polyester film-heat-bonded metal sheet according to claim 5, wherein the or each biaxially oriented polyester film is prepared by stretching a non-oriented film 2.5 to 5 times its original length in the longitudinal direction and 2.5 to 5 times its original width in the transverse direction, and then, heat-setting the stretched film at a temperature of 150° to 250° C.

7. A polyester film-heat-bonded metal sheet according to claim 5, wherein the biaxially oriented polyester film is prepared by stretching a non-oriented film 3.3 to 3.6 times its original length in the longitudinal direction and 3.4 to 3.8 times its original width in the transverse direction, and then, heat-setting the stretched film at a temperature of 220° to 240° C.

8. A polyester film-heat-bonded metal sheet according to claim 1 or 2, wherein the high melting point polyester is at least one polyester selected from the group consisting of polyethylene terephthalate, copolyesters of at least about 75% by mole of ethylene terephthalate and not more than about 25% by mole of ethylene isophthalate, polybutylene terephthalate, and copolyesters of at least about 85% by mole of butylene terephthalate and not more than about 15% by mole of butylene isophthalate.

9. A polyester film-heat-bonded metal sheet according to claim 1 or 2, wherein the low melting point polyester is at least one polyester selected from the group consisting of copolyesters of from about 50 to about 73% by mole of ethylene terephthalate and from about 27 to about 50% by mole of ethylene isophthalate, and copolyesters of from about 40 to about 83% by mole of butylene terephthalate and from about 17 to about 60% by mole of butylene isophthalate.

10. A polyester film-heat-bonded metal sheet according to claim 1, wherein the polyblend comprises, in addition to the high melting point polyester and the low melting point polyester, not more than 35 parts by weight of a polyolefin resin based on 100 parts by weight of the total of the high melting point polyester and the low melting point polyester.

11. A polyester film-heat-bonded metal sheet according to claim 10, wherein the amount of the polyolefin resin is not more than 30 parts by weight based on 100 parts by weight of the total of the high melting point polyester and the low melting point polyester.

12. A polyester film-heat-bonded metal sheet according to claim 10 or 11, wherein the polyolefin resin is at least one polymer selected form the group consisting of:

(i) ionomers which are copolymers of an α-olefin with ionic salts of an α,β-unsaturated carboxylic acid, said salts containing a metal ion of 1 to 3 valency, (ii) polyolefins graft-copolymerized with an α,β-unsaturated carboxylic acid or its functional derivative, said functional derivative being selected from anhydride, ester, amide, imide, sulfoalkyl ester and sulfoaryl ester, and;

(iii) copolymers of ethylene with an α,β-unsaturated monocarboxylic acid ester represented by the formula:

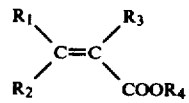

wherein $R_1$, $R_2$ and $R_3$ are independently hydrogen or an alkyl group having 1 to 3 carbon atoms and $R_4$ is an alkyl group having 1 to 12 carbon atoms.

13. A polyester film-heat-bonded metal sheet according to claim 12, wherein the ionomers are copolymers of ethylene with 1 to 20% by mole of methacrylic acid, 15 to 80% of the carboxylic groups in the copolymers being neutralized with zinc or magnesium.

14. A polyester film-heat-bonded metal sheet according to claim 12, wherein the graft-copolymerized polyolefin is polyethylene or polypropylene, graft-copolymerized with not more than 4% by mole of maleic anhydride or acrylic acid.

15. A polyester film-heat-bonded metal sheet according to claim 12, wherein the ethylene/α,β-unsaturated monocarboxylic acid ester copolymer is a copolymer of 50 to 99% by weight of ethylene and 1 to 50% by weight of a methyl or ethyl ester of acrylic or methacrylic acid.

16. A polyester film-heat-bonded metal sheet according to claim 1, or 2, wherein at least one of the biaxially oriented polyester film and the adhesive layer contains 0.3 to 7% by weight of titanium dioxide.

17. A polyester film-heat-bonded metal sheet according to claim 1 or 2, wherein the total thickness of the biaxially oriented film and the adhesive layer is in the range of 5 to 500 microns, the adhesive layer has a thickness of at least 2 microns and the ratio in thickness of the biaxially oriented polyester film to the adhesive layer is in the range of 1/0.05 to 1/5.

* * * * *